United States Patent [19]

Larson et al.

[11] 4,313,669

[45] Feb. 2, 1982

[54] PHOTOGRAPHIC PRINT STACKING TRAY

[75] Inventors: Louis A. Larson, Golden Vallue; Charles L. Euteneuer, St. Michael, both of Minn.

[73] Assignee: Pako Corporation, Minneapolis, Minn.

[21] Appl. No.: 200,932

[22] Filed: Oct. 27, 1980

[51] Int. Cl.[3] ........................ G03B 19/00; B65H 31/20

[52] U.S. Cl. ........................................ 354/354; 271/209

[58] Field of Search ................ 354/354; 271/188, 190, 271/207, 209, 220, 224

[56] References Cited

U.S. PATENT DOCUMENTS 3,484,102 12/1969 Von Arland et al. .............. 271/207
3,556,513 1/1971 Howard .......................... 271/207 X
3,658,323 4/1972 Matwey ............................. 271/209
4,114,349 9/1978 Jensen et al. ........................... 53/54

FOREIGN PATENT DOCUMENTS 789,015 1/1958 United Kingdom ................ 271/220

OTHER PUBLICATIONS

Xerox Disclosure Journal, vol. 1, No. 9/10 Sep./Oct. 1976, pp. 39-40.

*Primary Examiner*—Donald A. Griffin
*Attorney, Agent, or Firm*—Kinney, Lange, Braddock, Westman and Fairbairn

[57] ABSTRACT

An improved photographic print stacking tray device includes a print tray concavely bowed transversely to the direction of travel and a central deflector. As the individual photographic prints are discharged from a conveying line onto the print tray, the central deflector pushes the central portion of each print downwardly while the side edge portions of each print are deflected upward by the print tray so that each print is bowed, thereby giving each print greater beam strength in the direction of travel.

8 Claims, 2 Drawing Figures

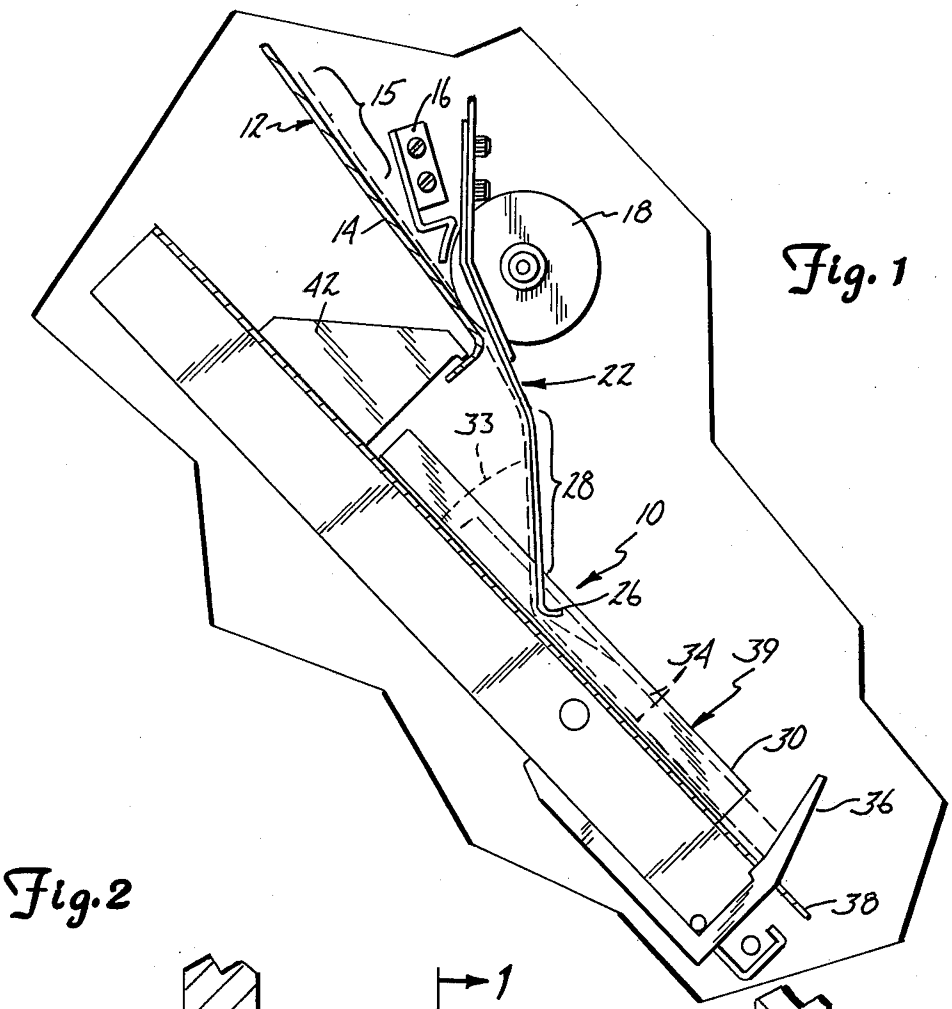
Fig. 1
Fig. 2
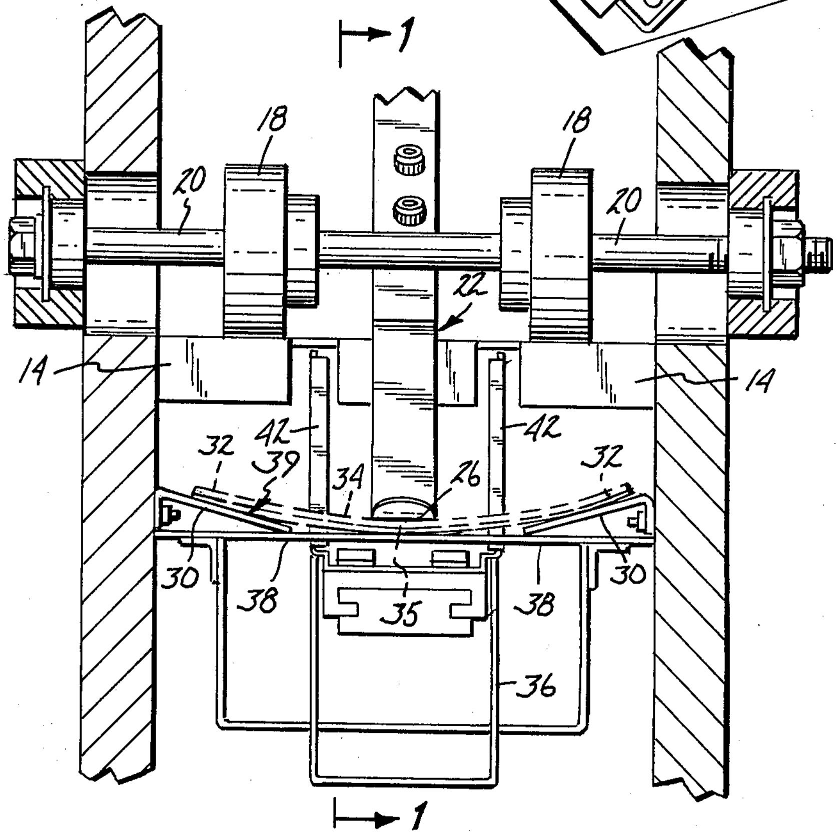

PHOTOGRAPHIC PRINT STACKING TRAY

REFERENCE TO CO-PENDING APPLICATION

Reference is made to a co-pending application by Armer J. Willenbring entitled "Photographic Print Stacking Device" Ser. No. 200,933, which was filed on even date, Oct. 27, 1980, with this application and is assigned to the same assignee.

BACKGROUND OF THE INVENTION

1. Field of the Invention.

The present invention relates to photographic print stacking devices.

2. Description of the Prior Art.

In the past, efforts have been made to produce high speed automatic sorting, conveying and stacking equipment to expedite the packaging of photographic prints. One advantageous system is the Pako Photopacker system in which photographic prints are cut, sorted, conveyed, stacked and inserted into a package on a fully automated basis. This system is illustrated in the Jensen et al U.S. Pat. No. 4,114,349 entitled "Automatic Sorting, Conveying and Packaging Mechanism for Photographic Prints", which is assigned to the same assignee as the present application.

SUMMARY OF THE INVENTION

The present invention provides an improvement in high speed automatic stacking of individual photographic prints. The photographic print stacking tray device includes a print tray concavely bowed transversely to the direction of travel, and a central deflector. As the individual photographic prints are discharged from a conveying line downwardly toward the print tray, both side edge portions of each print are deflected upwardly while the central deflector downwardly deflects the central portion of each print forming a concave bow in the print. The central deflector and concave bowed print tray continue to hold the stacked prints with a concave bow while subsequent prints are stacked thereon.

BRIEF DESCRIPTION OF THE DRAWINGS

FIG. 1 is a diagramatical view of the photographic print stacking device of the present invention taken generally along the line 1—1 of FIG. 2, with portions not shown for purposes of clarity.

FIG. 2 is a front elevational view of the photographic print stacking device of the present invention.

DETAILED DESCRIPTION OF THE PREFERRED EMBODIMENT

The high speed prior art print stacking system shown in the aforementioned Jensen et al patent has worked well in conveying and stacking individual photographic prints in the United States. However, it has been found that prints in other countries (in particular in Europe) tend to buckle as they are stacked on a print tray, resulting in jamming. It is believed that the buckling of photographic prints occurs when a leading edge of a print being discharged from a conveying system slides along top of a trailing portion of a previous print stacked onto the print tray with static forces holding the two print portions together. The trailing portion of the discharging print, however, continues in a downward and forward direction, buckling the photographic print in the transverse direction and jamming the photographic print stacking tray.

It has been discovered that the tendency of photographic prints to buckle in other countries appears to be due to the thinness of the print paper used. The thin print paper used in Europe has less rigidity in the direction of travel of the prints (i.e. the "machine direction") and therefore has a greater tendency to buckle in a high speed photographic print stacker.

An improved photographic print stacking tray device 10 of the present invention is illustrated in FIGS. 1 and 2. The print stacking tray device 10 is preferably mounted and used at discharge end 12 of a high speed automatic photographic conveying system and is preferably mounted below the discharge end 12. Mounting of the print stacking tray device 10 to the conveying system may be by any conventional method. In the preferred embodiment, discharge end 12 includes print conveyor bed 14 on which individual photographic prints are being conveyed along a path, indicated by broken line portion 15. Print guide 16 guides the individual prints between bed 14 and drive rollers 18. Drive rollers 18 rotate on shaft 20 keeping the individual photographic prints flat as they are being discharged from print conveyor bed 14 in the machine direction.

Upon exiting from discharge end 12, the photographic prints are deflected downward by central deflector 22, which is preferably a hold-down leaf spring. The photographic prints follow a path indicated by broken line portion 28.

Print tray 39 is formed by side deflectors 30 which support side edge portions 32 of stacked photographic prints 34, and tray base 38 which supports central portion 35 of prints 34. Tray base 38 and side deflectors 30 form a concave bow transverse to the direction of travel of prints 34. Having followed broken line portion 28, the leading edge of each print 34 initially engages both side deflectors 30 or a previously stacked print resting on side deflectors 30. Bottom portion 26 of the hold-down leaf spring 22 pushes downwardly on central portion 35 of each photographic print 34 as print 34 is driven onto the stack. Each print's trailing edge falls rearwardly of the hold-down leaf spring 22 to rest on side deflectors 30, as indicated by broken line 33 in FIG. 1, permitting the next print to follow without any interference from the stacked prints.

Bottom portion 26 of hold-down leaf spring 22 is at a lower elevation than the portions of the side deflectors 30 engaging the edge portion 32 of prints 34. The combination of the hold-down leaf spring 22 pushing downwardly central portion 35 of the photographic print 34 while the side edges of print 34 are being held up by the side deflectors 30 bows the print 34 concavely transversely to the direction of travel of print 34, as shown in FIG. 2. Side deflectors 30 are shown preferably as downwardly inclined surfaces of print tray 39 but other configurations of side deflectors 30 and tray base 38 that produce a bowed concave shape transverse to the direction of travel are within the scope of the invention. In addition, in another preferred embodiment print tray 39 is of a unitary construction with side deflectors 30 and tray base 38 being integral elements.

Photographic prints 34, as shown in FIG. 1, abut against the print stop 36 in a stacked relationship. Print tray 38 provides support for the stacked photographic prints 34. As each photographic print 34 stops against print stop 36, it is held in a concave bow while a trailing print is being stacked on top in the same manner as previous prints had been stacked. Central deflector 22 and the concavely bowed print tray (formed by tray base 38 and side deflectors 30) continue to hold the stacked prints 34 with a concave bow while subsequent prints are being stacked thereon.

Preferably, print ejection element 42 engages the stack of prints 34 at the end of an order, discharging the print stack into a packaging envelope (not shown). Print stop 36, which is pivotally connected below tray base 38, is pivoted out of the discharge path of the stack of prints being ejected by print ejector 42.

Photographic print stacking device 10 is preferably used to collect the good prints in an automatic sorting, conveying and packing mechanism like that in the previously mentioned Jensen et al patent. Device 10 minimizes jamming of photographic prints due to the thickness of the print paper.

CONCLUSION

The photographic print stacking device of the present invention concavely bows the individual photographic prints as they are being stacked. Since the concave bow is transverse to the direction of travel of the prints, a rigidity of beam strength is added to the photographic prints which is sufficient to overcome any tendency to buckle during the stacking process.

Although the present invention has been described with reference to the preferred embodiment, persons skilled in the art will recognize that changes may be made in form and detail without departing from the spirit and scope of the invention.

What is claimed is:

1. A photographic print stacking tray device for stacking individual photographic prints as they are discharged in a machine direction from a discharge end of a print conveying apparatus, the device comprising:

tray means positioned generally below the discharge end to receive individual photographic prints and collecting the prints in a stack as the prints are driven in the machine direction out of the discharge end, the tray means being concavely bowed in a transverse direction; and central deflection means for deflecting each individual print driven from the discharge end downward toward the tray means, the central deflection means engaging a central portion of the print to cause the print to generally conform to the concave bow of the tray means in the transverse direction as it is stacked, and wherein the central deflection means has a lower end portion for engaging the stack of prints proximate the center of the stack such that the stack of prints is retained in a transversely bowed configuration.

2. The device of claim 1 wherein the tray means has side deflector surfaces elevated on both sides of the central deflection means for elevating side edge portions of the photographic print with respect to central portions of the photographic print.

3. The device of claim 2 wherein the side deflector surfaces are integral surfaces to the tray means, each surface inclined downwardly toward each other.

4. The device of claim 2 wherein the lower end portion of the central deflection means engages the center of the stack of prints downwardly below the side deflector surfaces for bowing the photographic prints.

5. The device of claim 1 wherein the central deflection means is a hold-down leaf spring.

6. The device of claim 5 wherein the leaf spring has an upper end portion rigidly attached proximate the print conveying apparatus.

7. A photographic print stacking tray device for stacking individual photographic prints as they are discharged in a machine direction from a discharge end of a print conveying apparatus, the device comprising:

tray means positioned generally below the discharge end to receive individual photographic prints and collecting the prints in a stack as the prints are driven in the machine direction out of the discharge end, the tray means being concavely bowed in a transverse direction; and a central deflection leaf spring having an upper end portion rigidly attached proximate the print conveying apparatus, and having a lower end portion proximate the tray means, wherein the spring deflects prints driven from the discharge end downward toward the tray means, and engages a central portion of the print with the lower end portion to cause the print to generally conform to the concave bow of the tray means in the transverse direction as it is stacked.

8. A method for stacking individual photographic prints, the method comprising:

discharging each individual photographic print from a discharge end of a print conveying apparatus;

engaging a leading edge of each individual photographic print with a deflector;

deflecting each photographic print downwardly for stacking onto a tray having a tranversely concavely bowed surface, wherein each print is stacked on top of previously stacked prints; and engaging a central portion of the print as it is being stacked with a lower end portion of the deflector to cause the stack of prints generally to conform to the concavely bowed surface of the tray.

* * * * *